Figure 1:
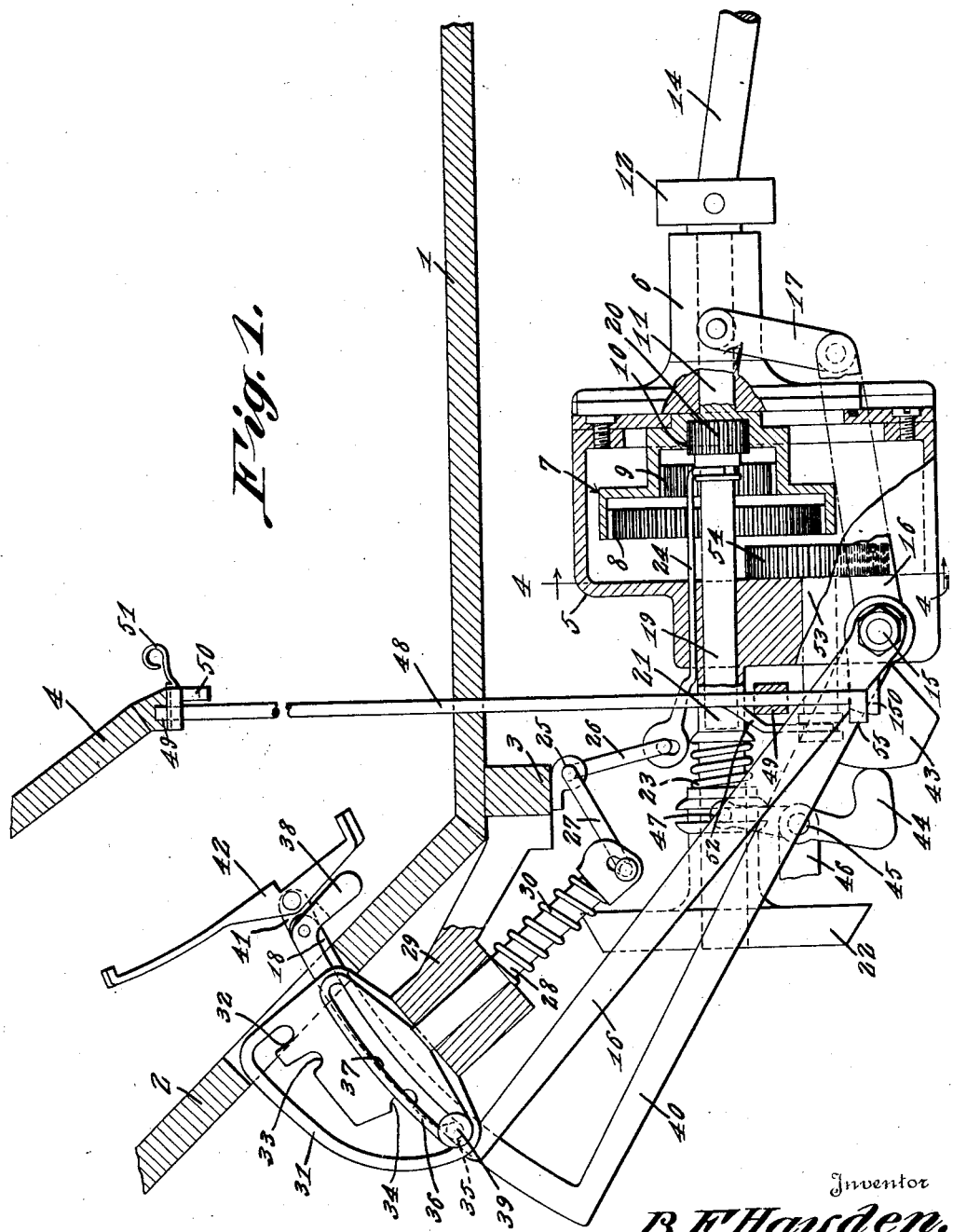

Feb. 21, 1928. 1,660,162
B. F. HAYDEN
GEAR TRANSMISSION FOR AUTOMOBILES
Original Filed Oct. 18, 1922 3 Sheets-Sheet 1

Inventor
B. F. Hayden,
By C. A. Snow & Co.
Attorney

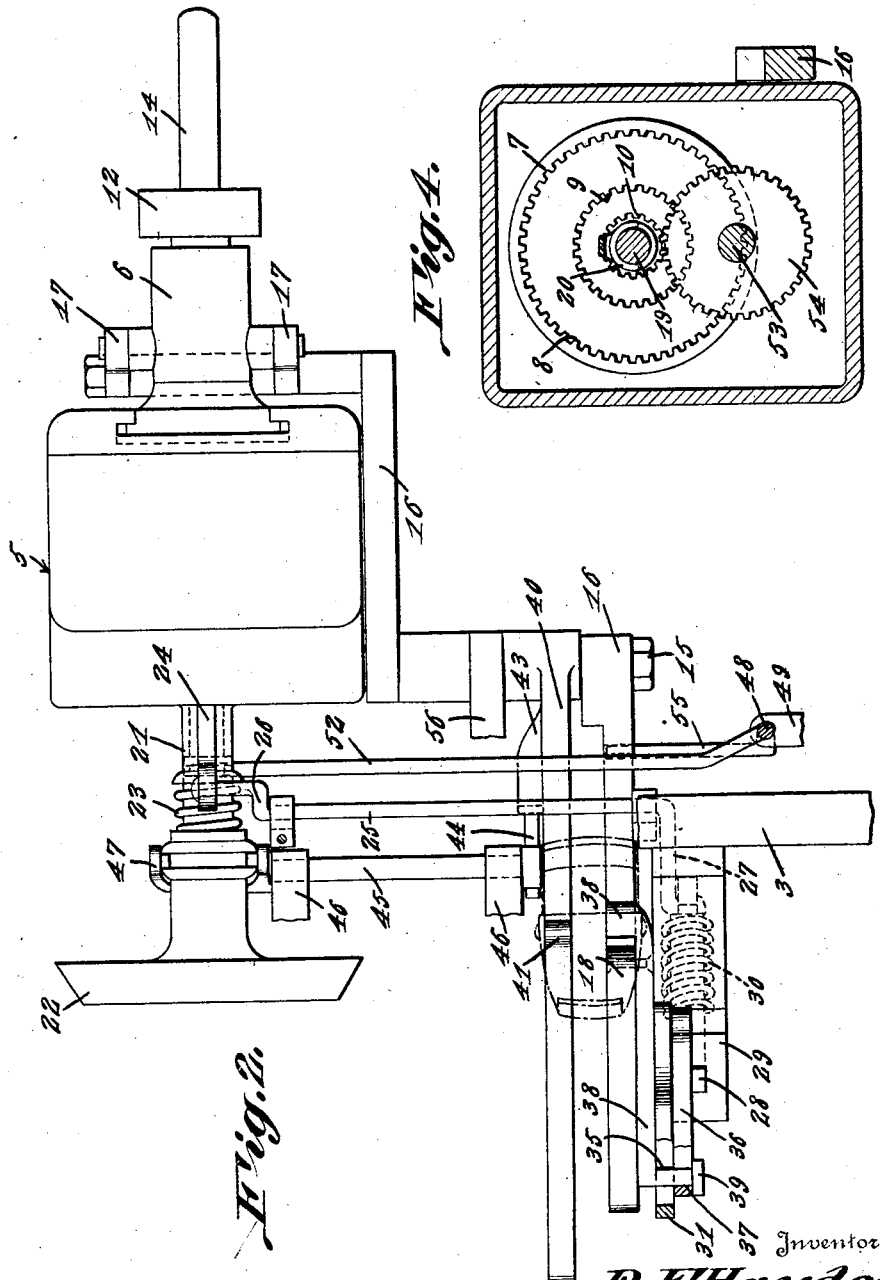

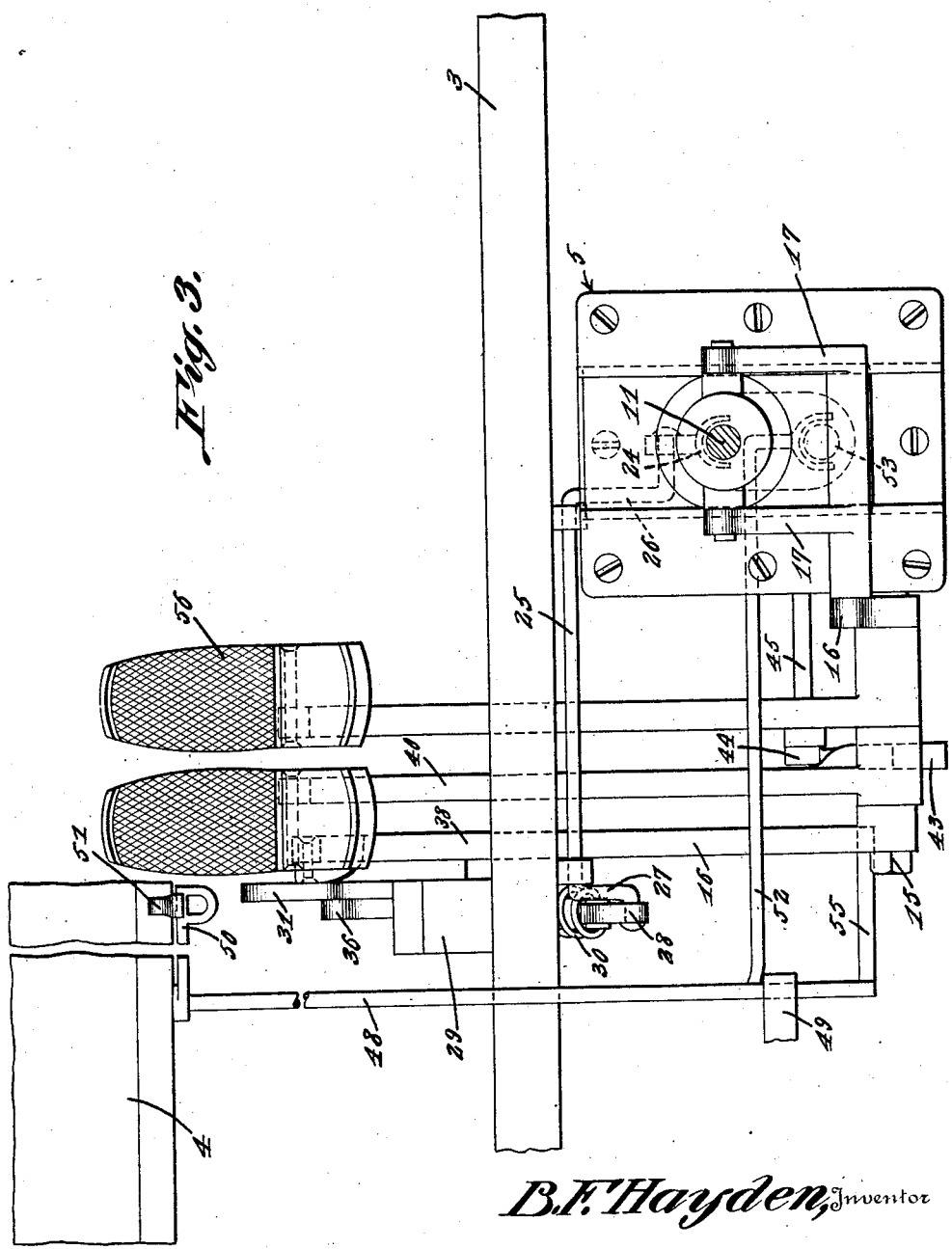

Patented Feb. 21, 1928.

1,660,162

UNITED STATES PATENT OFFICE.

BENJAMIN F. HAYDEN, OF ST. LOUIS, MISSOURI.

GEAR TRANSMISSION FOR AUTOMOBILES.

Application filed October 18, 1922, Serial No. 595,300. Renewed January 11, 1928.

This invention aims to provide a simple means whereby the gears in the transmission of an automobile may be shifted automatically in consonance with the clutch mechanism.

In the accompanying drawings:—

Figure 1 shows in vertical section, a device constructed in accordance with the invention, parts being broken away; Figure 2 is a top plan; Figure 3 is a rear elevation; Figure 4 is a section on the line 4—4 of Figure 1.

In the drawings, the numeral 1 marks the floor board of a vehicle, the foot board appearing at 2, and the numeral 3 marking a portion of the framework of the vehicle. The instrument plate is designated by the numeral 4. A gear housing or frame 5 is provided, a bearing 6 being mounted for reciprocation on the rear end of the housing 5. A gear member 7 is located within the housing 5 and has internal gears 8 and 9 and a socket 10, the gear 9 being of smaller diameter than the gear 8, and the socket 10 being of smaller diameter than the gear 9. The gear member 7 is carried by a shaft 11 journaled in the vertically slidable bearing 6 and connected by a universal joint 12, to a propeller shaft 14, which, in its turn, is connected as usual to the differential (not shown).

The gear housing 5 supports a laterally projecting pivot element 15 whereon a bell crank lever 16 is mounted for vertical swinging movement, the lever 16 being supplied at its forward end with an upstanding arm 18 and having a lug 150 on its lower edge. A double link 17 is pivoted to the rear end of the bell crank lever 16 and to the vertically slidable bearing 6. The housing 5 has a forwardly extended sleeve 21 wherein a drive shaft 19 is journaled for rotation and mounted for endwise sliding movement. The drive shaft 19 carries a pinion 20 of such size as to be received against rotation in the socket 10 of the gear member 7. When the drive shaft 19 is moved longitudinally, the pinion 20 on the drive shaft may be brought into engagement with the internal gears 8 and 9 of the member 7, at the will of an operator, when the bearing 6 and the gear member 7 are moved vertically. A clutch 22 is carried by the sleeve 21 and is advanced by a spring 23 into working position, the clutch being of any desired sort. A slide or operating member 24 is mounted for reciprocation in the casing 5 and is connected to the shaft 19 in such a way as to impart longitudinal movement thereto at the will of an operator. A horizontal shaft 25 is mounted to rock on the frame 3 and has a crank arm 26 engaged with the slide 24. The shaft 25 is supplied with a crank arm 27 pivoted to a plunger 28 slidable in a bracket 29 carried by the frame 3, a compression spring 30 abutting against the plunger and against the bracket to retract the plunger. The bracket 29 has a head 31 provided with internal seats 32, 33, 34 and 35. At its forward end, the plunger 28 carries a transverse guide 36 having an elongated slot 37. An angular latch 38 is pivoted adjacent to its upper end upon the arm 18 of the bell crank lever 16. The lower end of the latch 38 carries an angular projection 39 slidable in the slot 37 of the guide 36 of the plunger 28 and adapted to cooperate with the seats 32, 33, 34 and 35 of the head 31 on the bracket 29. A lever 40 is mounted to swing on the pivot element 15 and has an upstanding end 41. A pedal 42 is pivoted to the upper extremity of the part 41 of the clutch lever 40 and is adapted to coact with the upper end of the latch 38. The clutch lever 40 has a side cam 43 adapted to cooperate with an arm 44 on a shaft 45 mounted to rock on any accessible part 46 of the vehicle frame, the shaft carrying a fork 47 coacting with the clutch 22 to retract the clutch against the action of the spring 23.

A vertical shaft 48 is journaled on the vehicle frame and on the instrument plate 4, as indicated at 49, the shaft having a handle 50 adapted to coact with a latch 51 on the instrument plate. The shaft 48 has an upper arm 52 interengaged with a shaft 53 to impart longitudinal movement thereto, the shaft being mounted for rotation and for reciprocation in the housing 5. A reversing gear 54 is secured to the shaft 53 and is disposed adjacent to the forward wall of the housing 5. The shaft 48 has a lower arm 55 adapted to cooperate with the lug 150 on the forward portion of the bell crank lever 16. The numeral 56 in Figure 3 marks the brake pedal, the same being carried on the pivot element 15, if desired, and having no particular function in the device forming the subject matter of this application.

The operator places his foot on the pedal 42 and swings the clutch lever 40 downwardly, the cam 43 coacting with the arm 44 to rock the shaft 45, the fork 47 retracting the clutch 22 against the action of the spring 23. When the clutch lever 40 is carried downwardly, the pedal 42, coacting with the end 18 of the bell crank lever 16, swings the forward end of the bell crank lever 16 downwardly, the link 17 raising the vertically slidable bearing 6 on the housing 5 so that the socket 10 is positioned to receive the pinion 20 on the shaft 19. The operator tilts the pedal 42 on the end 41 of the lever 40, the pedal tilting the latch 38, to disengage the projection 39 from any one of the seats 32, 33 or 34, in which it happens to be lodged. The operator then can tilt the pedal 42 in an opposite direction to ease off on the latch 38, and to permit the latch, at its lower edge, to move rearwardly, with the plunger 28, the plunger 28 moving rearwardly responsive to the action of the spring 30, the arm 27 rocking the shaft 25, and the arm 26 imparting motion to the slide 24, the slide carrying the pinion 20 rearwardly into engagement with the socket 10 of the gear member 7, the gear mechanism then being coupled up in high. The projection 39 on the latch 38 is engaged with the seat 35 of the head 31 on the bracket 29 and the bell crank lever 16 thus is held against movement. When pressure on the pedal 42 is relieved, the clutch lever 40 moves upwardly, the clutch being thrown in. By engaging the projection 39 in the seats 34 and 33, and by engaging the pinion 20 with the internal gear 9 or with the internal gear 8, the gear mechanism may be held either in second or in low.

By means of the handle 50, the operator may rotate the shaft 48 until the arm 55 on the shaft cooperates with the lug 150 on the lever 16 to prevent the right hand end of the lever (Fig. 1), the bearing 6 and the gear member 7 from moving downwardly, when the clutch lever 40 is moved upwardly, as hereinafter described. The operator then tilts the pedal 42 and the latch 38, the projection 39 being disengaged from the seat 35, the clutch lever 40 moving upwardly, the clutch 22 being thrown out, and the parts 28—27—25—26—24 moving the shaft 19 and the pinion 20 to the left until the pinion 20 is in vertical alinement with the gear 8. The shaft 48 is rocked by the handle 50 until the arm 55 on the shaft is disengaged from the lug 150 on the lever 16. This sets the lever 16 free, and the bearing 6 slides downwardly, bringing the gear 8 into mesh with the pinion 10, which, it is to be recalled, is in vertical alinement with the gear 8. The shaft 48 is rocked and the arm 52 on the shaft slides the shaft 53 to the right in Figure 1, bringing the reversing pinion 54 into mesh with the gear 8 and the pinion 20. The lever 40 now may be swung down far enough to throw in the clutch 22, before the pedal 42 engages the arm 18 of the lever 16, the gear elements 54, 20 and 8 remain interengaged, and reverse rotation being imparted to the gear member 7, and to the shafts 11 and 14.

What is claimed is:—

1. In a device of the class described, a housing; a gear; means for mounting the gear on the housing for rotation and for movement transversely of its axis; a pinion; means for mounting the pinion on the housing for movement longitudinally of the axis of the gear, into and out of engagement with the gear; a lever fulcrumed for swinging movement; means for connecting the lever with the gear to move the gear transversely of its axis; a latch mounted to swing on the lever; fixed means wherewith the latch is adapted to engage; a clutch; a lever operating the clutch and constituting means for actuating the first specified lever; and a pedal on the clutch lever, the pedal constituting means for operating the latch; and means operated by the latch for moving the pinion with respect to the gear.

2. In a device of the class described, a first lever mounted for swinging movement; a latch mounted to swing on the first lever; fixed means wherewith the latch is adapted to engage; a clutch; a clutch lever, the clutch lever constituting means for operating the first lever; a pedal tiltable on the clutch lever and coacting with the latch; relatively movable gear elements; means for connecting one of said gear elements with the first lever; and means for connecting the other of the gear elements with the latch.

3. In a device of the class described, a first lever mounted for swinging movement; a latch mounted to swing on the first lever; fixed means wherewith the latch engages; a clutch lever; a pedal tiltable on the clutch lever and constituting means for actuating the latch; a plunger mounted for reciprocation; means for connecting the plunger slidably with the latch; relatively movable gear elements; means for connecting one of said gear elements with the first lever; and means for connecting the other of said gear elements with the plunger.

4. In a device of the class described, a first lever mounted for swinging movement; a latch mounted to swing on the first lever; fixed means wherewith the latch is adapted to engage; a clutch; a clutch lever; a pedal mounted to move on the clutch lever and constituting means for actuating the latch; relatively movable gear members; means for connecting the gear members operatively with the first lever and with the latch; a reversing pinion shiftable into and out of engagement with the gear members; and mechanism for shifting the reversing pinion, a portion of said mechanism being movable into and out of the path of the first lever.

In testimony that I claim the foregoing as my own, I have hereto affixed my signature.

BENJAMIN F. HAYDEN.